3,203,652
AIRCRAFT FLIGHT CONTROL APPARATUS
Jerry Doniger, Montvale, N.J., and Fred J. Belsky, Los Angeles, Calif., assignors to The Bendix Corporation, Teterboro, N.J., a corporation of Delaware
Filed July 5, 1963, Ser. No. 292,822
11 Claims. (Cl. 244—77)

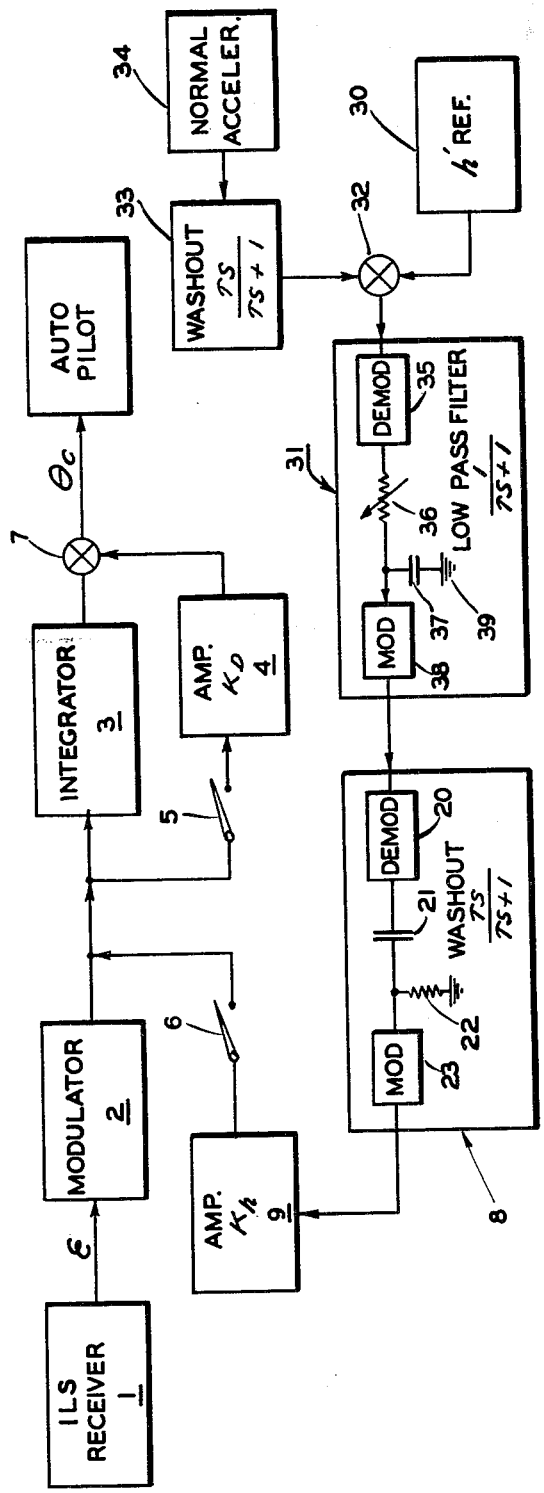
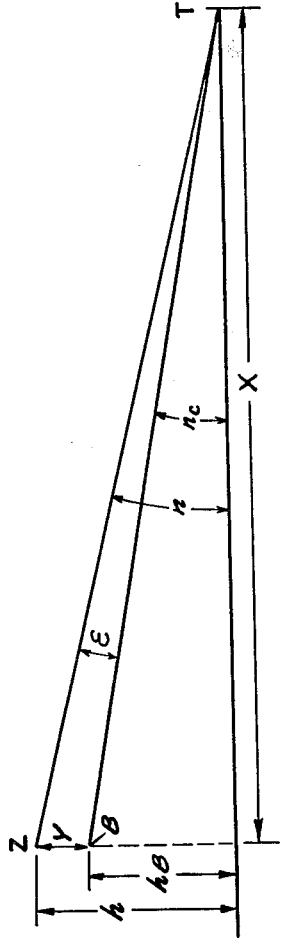
Aug. 31, 1965  J. DONIGER ETAL  3,203,652
AIRCRAFT FLIGHT CONTROL APPARATUS
Filed July 5, 1963
FIG. 1
FIG. 2
INVENTORS
JERRY DONIGER
FRED J. BELSKY.
BY
AGENT United States Patent Office 3,203,652
Patented Aug. 31, 1965

The invention relates to an apparatus for capturing the center line of a radio defined glide slope beam of an instrument landing system of an aircraft at low altitudes under input noise conditions.

In conventional systems, a receiver is adapted to provide a signal representative of the magnitude and sense of the displacement of the aricraft with respect to the center line of a particular glide slope beam. This signal is not sufficient to cope with what is commonly referred to as long term error. Long-team error is generally caused by wind or change in loading. It results from unbalance, in opposition to which an autopilot provides an equal counter force. While supplying the balancing force, and while the original unbalance force continues, the autopilot is incapable of correcting the error. As a result, steady state error exists.

To compensate for long-term error, couplers in conventional systems are arranged to operate on the displacement signal so as to form a signal corresponding to the integral of the displacement signal. This integral term is added to the displacement signal to provide a pitch command signal. Any error condition is recognized by the integrator computer which builds up a control force equal and opposite to the unbalance force. When this counter force is built up by the integrator, the autopilot is enabled to correct the error condition in normal fashion.

The combination of the displacement signal and the integral signal provides an accurate pitch command signal to control the aircraft to the beam center down to an altitude of 200 feet. Since the disturbances on received glide slope error signal increase appreciably during the latter portion of the approach descent below an altitude of 200 feet, due to terrain reflections on the transmited signal, present approach couplers are limited to operations above this altitude.

Noise contained in the integral of the displacement signal is not a serious problem because integration results in smoothing. Considerable noise is present in the displacement signal at low levels due to ground reflections. The present invention replaces the displacement signal by an equivalent signal of lower effective noise content.

The invention utilizes a conventional glide path coupler for the initial capture phase of the glide slope beam. After an arbitrary time interval, the coupler is modified so as to disconnect the radio defined displacement signal and to connect an equivalent signal of lower effective noise content. This signal is then combined with the integral signal to provide an accurate pitch command signal down to 50 feet. By retaining the integral term, the beam noise is subject to smoothing while a long-term track reference is provided.

The radio defined displacement signal is proportional to the integral of a washed out rate of descent signal. The magnitude of the substituted signal is based on this relationship. Thus, the system of this invention includes means for developing a noise-free rate of descent signal, and a washout for this signal. The integrator which has an input connected to the glide path receiver also has an input selectively connected to the output of the washout.

In order to minimize the effects of noise in the altitude rate signal, the rate of descent signal is passed through an augmentation circuit, which uses the rate of descent signal as a low frequency reference and a modified normal accelerometer as a high frequency reference. This combination of signal, when applied to a low pass filter, provides a noise-free rate of descent signal. In addition, any noise that is part of the rate of descent signal is also reduced by the operation of the integrator.

An object of the invention is to extend automatic approach to low altitudes.

Another object is to apply a noise-free command signal to a flight control system at low altitudes under input noise conditions.

Another object of the invention is to substitute an equivalent signal for the radio defined displacement signal.

Another object of the invention is to utilize a washed out rate of descent signal as a substitute for a noisy radio defined displacement signal.

Another object of the invention is to judiciously mix a rate of descent signal and the integral of a radio defined displacement signal so as to capture the beam center down to altitudes as low as 50 feet.

Another object of the invention is to utilize an altitude rate signal which is relatively noise free.

Another object of the invention is to reduce the amount of noise in the rate of descent signal by utilizing an augmentation circuit which uses a barometric signal as a low frequency reference and a modified normal accelerometer signal as a high frequency reference.

Another object of the present invention is to further minimize noise in the rate of descent signal by the action of an integrator.

Another object of the present invention is to provide a system less sensitive to beam convergence than a standard approach coupler using displacement and integral terms to form the pitch command signal.

Another object of the present invention is to utilize components available in standard autopilot/coupler systems so that modifications to use this invention are minimized.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

In the drawings:

FIGURE 1 is a functional schematic diagram of the device of this invention.

FIGURE 2 illustrates characteristics of the descent path glide slope.

Referring to FIGURE 1, conventional equipment used for instrument landing is shown as glide path receiver 1 for receiving a vertical guidance signal from a glide path transmitter (not shown). In a conventional manner, the receiver 1 is connected with modulator 2 for developing an A.C. signal output, in accordance with a D.C. input, which corresponds in magnitude and sense to the extent and direction of angular displacement of the craft from a respective beam.

The displacement signal from modulator 2 is fed to both an integrator 3 and amplifier 4. The displacement signal is applied to amplifier 4 via selectively operable switch 5. A typical integrator is shown in U.S. Patent No. 3,002,713 issued October 18, 1961 to P. A. Noxon et al. The output signal of the integrator is directly proportional to the time integral of the input voltage signal. The output signal from integrator 3 compensates for long-term error while the output signal from amplifier 4 compensates for short-term error. The integral term and the displacement term are combined at summation device 7 to provide a pitch command signal $\theta_c$, where (1) $$\theta_c = K_D \epsilon + K_i \int_0^T \epsilon \, dt$$

where $\epsilon$ = beam displacement
$K_i$ = integral gain
$K_D$ = displacement gain This signal is used during the initial capture phase of the glide slope beam.

At low altitudes, especially below 200 feet, the displacement signal cannot be used because of noise due to ground reflection. The present invention replaces the displacement signal by an equivalent signal of lower effective noise content. The system of the present invention still develops a signal representative of angular displacement from the glide slope beam as determined by the radio defined displacement signal by retaining the integral term. This signal is relatively noise free due to the smoothing effect of the integrator.

After the initial capture phase, switch 5 is disconnected and a second control circuit is put into operation to provide a noiseless signal equivalent to the displacement signal ($K_D \epsilon$). A selectively operable switch 6, which is open during the initial capture phase, connects a second control circuit to integrator 3. The switchover is initiated manually or by conventional relay circuits (not shown) which may be responsive to height, time, etc. The switchover does not affect the integral signal.

The second control circuit provides a signal which is equal to the displacement signal but of lower effective noise content. Referring to FIGURE 2 (the various angles shown in FIGURE 2 have been exaggerated for ease of illustration) this signal may be developed in term of mathematical notation as follows:

(2) $$\epsilon = n - n_c$$

where $\epsilon$ = beam displacement
$n$ = angle of elevation of the aircraft formed by the runway and by a line $T_z$ drawn from the ground transmitter to the aircraft
$n_c$ = angle of elevation of the glide slope beam $T_B$ with respect to the runway.

(3) $$\tan n = \frac{h}{x}$$
$$\tan n_c = \frac{h_B}{x}$$

where $h$ is the height of the aircraft and $h_B$ is the height of the beam at slant range $x$.

(4) $$n = \frac{h}{x}; \quad n_c = \frac{h_B}{x}$$

because $n$ and $n_c$ are very small angles, approximately 2½°, and therefore, their values, in terms of radians, are very close to tangent values.

(5) substituting (4) in (2), $$\epsilon = \frac{h}{x} - \frac{h_B}{x} = \frac{h - h_B}{x}$$

(6) But, $$h - h_B = \int_0^T \dot{h} \, dt - \int_0^T \dot{h}_B \, dt + \Delta h_0$$

where $\dot{h} = \frac{dh}{dt}$ = actual rate of descent $\dot{h}_B = \frac{dh_B}{dt}$ = rate of descent when on beam $\Delta h_0$ = initial displacement from the beam (7) Then $$\epsilon = \frac{1}{x} \left[ \int_0^T \dot{h} \, dt - \int_0^T \dot{h}_B \, dt + \Delta h_0 \right]$$

In developing a signal based on the above equation, $x$ may be assigned a constant value and $\Delta h_0$ may be ignored. Although $x$ continually varies in value, a constant value equal to the average value of $x$ may be accurately arrived at. $\Delta h_0$, the initial displacement from the beam, is a constant and will be accounted for by the integral of the displacement signal.

The above equation requires that a bias signal, equal to the rate of descent when on beam, $\dot{h}_B$, be inserted to cancel the actual rate of descent, $\dot{h}$. If a value was assumed for $\dot{h}_B$, it would have to correspond with the actual rate of descent of the aircraft when on beam in order to avoid steady state beam errors. To accurately assume such a value, the airplane velocity and the actual glide slope angle must be known in advance. In order to obviate this impractical requirement, the present invention carries out this cancellation function by passing the $\dot{h}$ signal through a washout.

Referring to FIGURE 1, the washout circuit 8 is shown as comprising a demodulator 20 for demodulating an altitude rate signal. Demodulator 20 may be any conventional phase sensitive demodulator operating with a reference alternating voltage which is in phase with the altitude rate excitation voltage. The output of the demodulator 20 is a direct current signal proportional in amplitude and polarity to the magnitude and sense, respectively, of the input altitude rate signal. This signal is fed to washout circuitry comprising capacitor 21 and resistor 22. The washout circuitry is designed to have a time constant of approximately 30 seconds. A modulator 23 is connected to the washout circuitry and modulates the washed out, direct current altitude rate signal upon an alternating current carrier.

Coming now to the operation of the washout circuit hereinabove described, a rate of descent signal is communicated to and converted to D.C. by demodulator 20. The D.C. signal from demodulator 20 is applied to the washout circuitry causing the capacitor to charge. The increasing charge on the capacitor 21 offers an increasing opposition to the applied input altitude rate signal and causes the current to decrease. After an interval of time, the capacitor is fully charged and average current flow stops completely. Perturbations about the average are allowed to pass.

It will now be apparent that the overall washout circuit above described constitutes a system in which the rate of descent signal communicated to demodulator 20 operates the washout circuitry until its output is zero. For a steady state of the system therefore, i.e. where the altitude rate signal is of a given constant amplitude, the output signal from the washout will be zero. Only when the magnitude of $\dot{h}$ is changed will the washout have an output and this output will be equal to this change. The total output of the washout, as $\dot{h}$ is driven to its steady state value, $\dot{h}_B$, is the sum of all the changes in $\dot{h}$. The output of the washout when the steady state value, $\dot{h}_B$, is reached will be zero. The total output of the washout, therefore, is equal to the difference between the actual rate of descent, $\dot{h}$, and the rate of descent, $\dot{h}_B$, when on beam.

The transform function for the washout circuit is $$\frac{\tau S}{\tau S + 1}$$

Thus, (8) $$\int_0^T \dot{h} \, dt - \int_0^T \dot{h}_B \, dt = \int_0^T \dot{h} \left( \frac{\tau w S}{\tau w S + 1} \right) = \frac{1}{S} \left[ \frac{\tau w S}{\tau w S + 1} \right] \dot{h}$$

where $S$ = LaPlace operator.

Substituting this value into Equation 5 aforenoted, we obtain (9) $$\epsilon = \frac{1}{xs}\left[\frac{\tau wS}{\tau wS+1}\right]\dot{h}$$

(10) $$K_D\epsilon = \frac{K_D}{xs}\left[\frac{\tau wS}{\tau wS+1}\right]\dot{h}$$

By assuming a constant value of slant range $x$, a gain $$K_h = \frac{K_D}{x}$$

may be chosen. Thus,

(11) $$K_D\epsilon = \frac{K_h}{S}\left[\frac{\tau wS}{\tau wS+1}\right]\dot{h}$$

The manner in which the second control circuit develops the substitute signal for the radio defined displacement signal will now be described. A conventional rate of descent responsive device 30 such as the barometric device described in U.S. Patent No. 2,953,328, is used to produce a rate of descent signal ($\dot{h}$). Although not necessary, the $\dot{h}$ signal is passed through an augmentation circuit comprising elements 31–34 in order to minimize the disturbances associated with it due to turbulence and internal sensor noise. The details of this augmentation circuit will be described further on in the specification. The rate of descent signal is passed through washout 8 which modifies the signal by the quantity $$\frac{\tau S}{\tau S+1}$$

to form $$\dot{h}\left[\frac{\tau S}{\tau S+1}\right]$$

This signal is then fed through amplifier 9 having a gain, $K_h$. The resulting signal is then applied to integrator 3 which produces a signal $$\frac{K_h}{S}\left[\frac{\tau S}{\tau S+1}\right]\dot{h}$$

As developed in Equation 11 aforenoted, $$\frac{K_h}{S}\left[\frac{\tau wS}{\tau wS+1}\right]\dot{h}$$

is equal to the radio defined displacement signal, $K_D\epsilon$.

Any noise that is part of the rate of descent signal is attenuated by the operation of the integrator. The integrated rate of descent signal provides the equivalent of the beam error displacement signal, but without its characteristic noise.

In order to further minimize the effects of $\dot{h}$ noise, the $\dot{h}$ signal is passed through an augmentation circuit which uses the rate of descent signal as a low frequency reference and a modified normal accelerometer signal as a high frequency reference. This combination of signals when applied to low pass filter 31 provides a noise-free, instantaneous altitude rate signal $\dot{h}_a$.

The augmentation circuit includes a summing device 32 which has applied thereto an acceleration signal, $\tau A_N$ (where $\tau$=acceleration gain), and a rate of descent rate signal, $\dot{h}$. The output of the summing device is fed to a low pass filter 31 which is made up of a demodulator 35, an RC network 36, 37, 39 and a modulator 38. The demodulator provides a direct voltage corresponding in polarity and amplitude to the phase and amplitude of the input $\dot{h}_a$ signal. The output of the demodulator is connected through an RC filter circuit to the input of modulator 38. The RC circuit includes capacitor 37 which has one terminal connected to the variable resistor 36 and its opposite terminal connected to ground 39. A time constant of four seconds for low pass filter 31 is chosen as a compromise between the high values needed to filter the noise on the barometric rate of descent signal and the low values needed to minimize the dependence on the accelerometer as a long-term reference signal. The low pass filter modifies the summation by the quantity $$\frac{1}{\tau S+1}$$

The output $\dot{h}_a$ of the low pass filter 31 can be expressed as

(12) $$\dot{h}_a = \frac{\dot{h}_B}{\tau S+1} + \frac{\tau A_N}{\tau S+1}$$

(13) $$\dot{h}_a = \frac{1}{\tau S+1}(\dot{h}_B + \tau\ddot{h})$$

To the extent that the noise on $\dot{h}_B$ is concentrated at a frequency above $1/\tau$ rad./sec., $\dot{h}_a$ will be relatively noise free. Since the noise associated with $\dot{h}_B$ has been attenuated, we can say $\dot{h}_B = \dot{h}$ exactly, then substituting $S\dot{h}$ for $A_n$

(14) $$\dot{h}_A = \frac{1}{\tau S+1}(\dot{h} + \tau S\dot{h})$$

(15) $$\dot{h}_A = \frac{\dot{h}}{\tau S+1}(\tau S+1)$$

(16) $$\dot{h}_A = \dot{h}$$

A conventional normal accelerometer device 34 such as that described in Patent No. 3,008,078 may be used to produce a normal acceleration signal. This signal should be compensated for steady state errors due to mounting misalignment of the accelerometer, angle of attack of the aircraft and varying flight patterns of the aircraft. Thus, the angles of misalignment, attack, and flight pattern must be known in advance in order to accurately arrive at normal acceleration.

In order to avoid this impractical requirement, the acceleration signal is sent to the augmentation circuit through a high pass filter or washout 33. This washout 33 has a time constant of 20 seconds but is otherwise identical to washout 8. The washout will compensate for steady state errors by driving their input to zero. The washout output will only be responsive to changes in the normal acceleration signal. These changes are due to wind gusts. It is these same wind gusts which are responsible for the aircraft having any acceleration at all. Thus, the output of the washout 33 will substantially concur with the actual normal acceleration of the aircraft.

In the standard coupler, desensitization of the beam error is necessary because of the effective increase in gain since the error in degrees per foot deviation from the beam varies inversely with the longitudinal distance from the transmitter. In the second control circuit mode $K_h$, which is equivalent to $K_D$, is made constant, thus effectively desensitizing the equivalent of the beam error displacement signal.

Operation

A glide path receiver 1 picks up a beam displacement signal as in conventional instrument landing systems. This displacement signal is applied through modulator 2 to integrator 3 and through selectively operable switch 5 to amplifier 4. The resulting signal output from the summation device 7 is a pitch command signal $\theta_c$ where $$\theta_c = K_D\epsilon + K_i\int_0^T \epsilon\, dt$$

This signal is utilized during the initial capture phase.

The combination of the displacement signal and the integral signal provides an accurate pitch command signal to control the aircraft to the beam center down to an altitude of 200 feet. This pitch command signal cannot be used at lower altitudes because terrain reflections on the transmitted signal increase appreciably the received beam noise.

After an arbitrary time interval subsequent to the initial capture phase, switch 5 is disconnected and switch 6, which was open during the initial capture phase, connects a second control circuit to integrator 3. The function of the second control circuit is to substitute a relatively noiseless signal for the short-term component, $K_D\epsilon$, of the pitch command signal. The switchover can be made at high altitudes immediately after the initial capture phase, thus allowing the pilot adequate time to assess performance of the system prior to reaching lower altitudes.

The signal from the second control circuit may be expressed in terms of mathematical notation as $$K_D\epsilon = K_h \int_0^T (\dot{h} - \dot{h}_B) dt$$

In order to develop the signal, the second control circuit includes conventional normal accelerometer 34 and altitude rate responsive device 30. This combination of signals, when applied to low pass filter 31 provides an instanteous altitude rate signal $\dot{h}_a$, which is free of the noise associated with the altitude rate signal derived from device 30. The altitude rate signal is then applied to a washout 8. The washout 8 performs a function equivalent to subtracting $\dot{h}_B$ from $\dot{h}$. When the aircraft reaches the glide slope beam or steady state, $\dot{h}_B = \dot{h}$, and the washout output will be zero.

The output of the washout passes through amplifier 9 (gain=$K_h$) integrator 3. The output signal $$K_h \int_0^T (\dot{h} - \dot{h}_B) dt$$

from integrator 3 is equivalent to the beam displacement signal $K_D\epsilon$ thereby compensating for short-term error. This signal together with the integral of the displacement signal provides an accurate pitch command down to 50 feet.

Although only a single embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. Flight path control apparatus for an instrument landing system of an aircraft, comprising receiver means for providing a displacement signal proportional to the displacement of the aircraft from a glide slope beam, integrator means connected to the output of said receiver means for developing a signal corresponding to the integral of said displacement signal, means for supplying a signal proportional to the rate of descent of the aircraft, washout means responsive to said rate of descent signal and having an output upon the aircraft being off the center of said glide slope beam, means for supplying the output from said washout means to said integrator, said integrator being responsive to the output from said washout means for developing a further signal proportional to the integral of the output of said washout means, conductor means connected to receive said integrated signals to provide a pitch command signal to guide the aircraft on said glide slope beam.

2. The apparatus defined by claim 1 including means for reducing disturbances accounted with the rate of descent signal.

3. The apparatus defined by claim 2, said disturbance reducing means including signal generating means responsive to normal acceleration of said aircraft, signal generator means responsive to rate of descent of said aircraft, means for summing said acceleration signal and rate of descent signal, a low pass filter, the output of the summing means being applied to the low pass filter to thereby produce an instantaneous rate of descent signal free of turbulence and internal sensor disturbance associated with the first mentioned rate of descent signal.

4. Flight path control apparatus for an instrument landing system of an aircraft, comprising power means for operating a control surface of the aircraft, glide path receiver means for producing a signal proportional to the aircraft displacement from a glide slope beam, means responsive to said displacement signal for developing a signal corresponding to an integral of said displacement signal, summing means connected to said integrating means, first switch means for selectively applying said displacement signal to said summing means, said summing means combining said integral and displacement signals to operate said power means to correct for displacement of the aircraft from a center of the glide slope beam, means for supplying signal proportional to rate of descent of the aircraft, washout means having the rate of descent signal supplied thereto, a selectively operable second switch connecting an output of said washout means to said integrator whereby said integrated wash out signal may be substituted for the displacement signal by selective operation of said first and second switches so as to provide a relatively disturbance free command signal to the power means under input disturbance conditions.

5. The apparatus defined by claim 4 including means for reducing disturbances contained in the rate of descent signal.

6. The apparatus defined by claim 5 in which said disturbance reducing means includes signal generating means responsive to normal acceleration of said aircraft, signal generator means responsive to rate of descent of said aircraft, means for summing said acceleration signal and rate of descent signal, a low pass filter, the output of the summing means being applied to the low pass filter to thereby produce an instantaneous rate of descent signal free of turbulence and internal sensor disturbance associated with the first mentioned rate of descent signal.

7. Apparatus for guiding an aircraft on a selected course defined by a radio beam in an area of appreciable disturbances, comprising receiver means for providing a radio defined first displacement signal proportional to the displacement of the aircraft from the selected course, means for providing a signal proportional to the actual rate of descent of the aircraft, means responsive to said rate of descent signal for providing a second displacement signal proportional to the displacement of the aircraft from said selected course, said last mentioned means including means responsive to said first displacement signal for providing a signal corresponding to the integral of said first displacement signal, conductor means connected to receive said integral signal and said second displacement signal to provide a command signal to guide the aircraft on said selected course in the area of appreciable disturbances.

8. Apparatus for guiding an aircraft on a selected path defined by a radio beam in an area of appreciable disturbances, said apparatus comprising receiver means for providing a radio defined displacement signal proportional to the displacement of the aircraft from the selected path, means independent of said receiver means for developing a reference signal proportional to the rate of change of said displacement signal, integrating means utilizing said radio defined displacement signal as a low frequency reference and said reference signal as a high frequency reference for providing a command signal to guide the aircraft on said selected path in the area of appreciable disturbances.

9. Apparatus for guiding an aircraft to a selected path defined by a radio beam in an area of appreciable disturbances comprising receiver means for providing a radio defined displacement signal proportional to the displacement of the aircraft from the selected path, means independent of said receiver means for developing a displacement rate signal proportional to the rate of change of said displacement signal, and integrating means responsive to said radio defined displacement signal and to said displacement rate signal for providing a command signal to guide the aircraft on said selected course in the area of appreciable disturbances.

10. In apparatus for guiding an aircraft on a glide slope beam defined by a radio beam in an area of appreciable disturbances, receiver means for providing a displacement signal proportional to the displacement of the aircraft from the glide slope beam, signal generating means for providing a signal proportional to the rate of descent of said aircraft, washout means connected for receiving the output of said signal generating means, and integrator means responsive to the output of said washout means and said receiver means for providing a command signal to guide the aircraft on said glide slope beam in the area of appreciable disturbances.

11. Apparatus for guiding an aircraft on a selected path as defined in claim 9 in which the means independent of said receiver means for developing a displacement rate signal proportional to the rate of change of said displacement signal includes first means for providing a signal proportional to the normal acceleration of the aircraft, means receiving the acceleration signal and correcting steady sttae errors therein, second means for providing a signal proportional to the rate of descent of the aircraft, means for summing the rate of descent signal and the corrected acceleration signal, a low pass filter responsive to the output of the summing means for producing an instantaneous rate of descent signal free of turbulence and internal sensor disturbance associated with the first-mentioned rate of descent signal, and washout means connected to the low pass filter and providing a displacement rate signal proportional to the rate of change of the displacement signal.

References Cited by the Examiner

UNITED STATES PATENTS

| 3,030,053 | 4/62 | Smith | 244—77 |
| 3,038,156 | 6/62 | Osder | 343—107 |
| 3,045,955 | 7/62 | Markusen | 244—77 |
| 3,052,427 | 9/62 | Match | 244—77 |
| 3,058,699 | 10/62 | Osder | 244—77 |
| 3,077,557 | 2/63 | Joline | 244—77 |

FERGUS S. MIDDLETON, *Primary Examiner.*

RALPH D. BLAKESLEE, MILTON BUCHLER,
*Examiners.*

UNITED STATES PATENT OFFICE
CERTIFICATE OF CORRECTION

Patent No. 3,203,652                                              August 31, 1965

Jerry Doniger et al.

It is hereby certified that error appears in the above numbered patent requiring correction and that the said Letters Patent should read as corrected below.

Column 7, line 63, for "accounted" read -- associated --.

Signed and sealed this 3rd day of May 1966.

(SEAL)
Attest:

ERNEST W. SWIDER                                        EDWARD J. BRENNER
Attesting Officer                                                Commissioner of Patents